United States Patent
Ball et al.

(10) Patent No.: US 6,244,099 B1
(45) Date of Patent: Jun. 12, 2001

(54) DRAW FURNACE SEALING ASSEMBLY AND METHOD

(75) Inventors: Steven Craig Ball; John Morris Barnard, Sr., both of Wilmington; James Alan Snipes, Concord, all of NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/400,400

(22) Filed: Sep. 21, 1999

Related U.S. Application Data (60) Provisional application No. 60/121,802, filed on Feb. 26, 1999.

(51) Int. Cl.[7] .............................. G01M 3/08; G01M 3/04
(52) U.S. Cl. .................................. 73/46; 73/40; 73/40.7
(58) Field of Search ........................... 73/46, 40, 40.7; 219/635, 651; 373/137, 27; 65/374.13, 425, 435, 509, 537

(56) References Cited

U.S. PATENT DOCUMENTS

| | | | |
|---|---|---|---|
| 4,157,906 | 6/1979 | Bailey | 65/3 |
| 4,547,644 | 10/1985 | Bair et al. | 219/10.49 |
| 4,720,256 | * 1/1988 | Asari et al. | 425/78 |
| 5,284,499 | 2/1994 | Harvey et al. | 65/3.11 |
| 5,380,378 | * 1/1995 | Hemsath | 148/601 |
| 5,410,567 | 4/1995 | Brundage et al. | 373/137 |
| 5,637,130 | 6/1997 | Nagayama et al. | 65/435 |

FOREIGN PATENT DOCUMENTS

| | | |
|---|---|---|
| 1 523 595 | 9/1978 | (GB) . |
| 62-036039 | 7/1987 | (JP) . |
| 4-342435 | 4/1993 | (JP) . |
| 8-325030 | 4/1997 | (JP) . |
| 11255533 * | 9/1999 | (JP) ................. C03B/37/014 |

* cited by examiner

Primary Examiner—Hezron Williams
Assistant Examiner—Jay L. Politzer
(74) Attorney, Agent, or Firm—Timothy R. Krogh (57) ABSTRACT

An apparatus and method for sealing the bottom of an optical waveguide draw furnace is disclosed. The apparatus includes an assembly constructed and arranged to mate with the bottom of the draw furnace to form a seal, and a leak detection system communicating with the assembly to signal the forming of a proper or an improper seal. The covering plate of the assembly is selectively seated on the sealing plate of the draw furnace to form the seal, and an inert gas is delivered between the covering plate and the bottom of the draw furnace. The flow of the inert gas is detected to determine if the seal has been properly formed. An assembly including a covering plate having at least two radially spaced gaskets circumferentially positioned on the top surface of the covering plate for engagement with the sealing plate at the bottom of the draw furnace, and a method for sealing the bottom of a draw furnace are also disclosed.

28 Claims, 4 Drawing Sheets

DRAW FURNACE SEALING ASSEMBLY AND METHOD

This application claims the benefit of Provisional No. 60/121,802 filed Feb. 26, 1999.

BACKGROUND OF THE INVENTION

1. Field of the Invention

The present invention relates generally to a method and assembly for sealing a draw furnace, and more particularly, to a sealing assembly and method for sealing the bottom of an optical waveguide draw furnace.

2. Technical Background

Relatively high temperature heat sources are required for drawing high strength, low loss optical waveguide fibers from a high silica-content optical waveguide fiber preforms or blanks. Two of the predominant heat sources utilized for drawing such fibers are zirconia furnaces and graphite furnaces. Fiber draw furnaces generally operate at temperatures greater than about 1900° C., typically as high as about 2050° C.

A disadvantage associated with zirconia induction furnaces is that extended use and thermomechanical stresses due to poor thermal shock resistance cause cracks in the muffle and susceptor. This cracking causes zirconia particles to migrate from the inner surface of the furnace onto the preform and/or fiber being drawn from the preform, resulting in substantially weakened fiber and unacceptable product losses. Moreover, zirconia induction furnaces are sensitive to rapid changes in temperature. Accordingly, significant amounts of time are necessary for increasing and decreasing the temperatures within the furnace. Rapid heating and cooling of the furnace results in fracturing of the zirconia muffle, which necessitates replacement of the muffle and results in significant furnace down time.

Such shortcomings lead to the development of graphite induction furnaces. Graphite induction furnaces typically include a graphite muffle which is insensitive to rapid changes in termperature and thus is less susceptible to cracking. It has been found, however, that graphite furnaces are susceptible to oxidation at temperatures approaching about 450° C. and that oxidation is particulary problematic when the graphite is exposed to the high temperatures used to draw optical waveguide fibers. For this reason, among others, it is preferrable to maintain an inert atmosphere within the draw furnace. Oxidation occurs when gasses from ambient atmosphere react with the solid carbon muffle at high temperatures according to the following reactions:

(1) $C+O_2 \rightarrow CO_2$; and (2) $C+CO_2 \rightarrow 2CO$.

A typical onset temperature for reaction (1) for a graphite grade used in a draw furnace is about 700° C. Reaction (2) becomes significant above 900° C. These reactions of the furnace muffle with oxygen and carbon dioxide cause the furnace muffle to be consumed, especially at elevated fiber drawing temperatures, and are referred to generally as CO events.

The graphite muffle material is a composite of graphite grains bonded together by a carbon binder matrix. It is believed that the binder material is more susceptible to oxidation than the graphite grains. Therefore, when the composite of the two materials is exposed to air, and thus oxygen at temperatures above the oxidation onset temperatures, the matrix binder material preferentially oxidizes. The graphite grains, having no binder left to hold them in place, are then free to fall away from the composite structure. It is believed that this mechanism causes graphite particulate to migrate from the muffle wall to the fiber preform and/or fiber during drawing.

Graphite particulate that becomes incorporated into the fiber during drawing causes unacceptable product losses due to point defects. Point defects manifest themselves as sharp attenuation increases in the signal transmitted through the fiber. Point defect product losses due to graphite particulate from a draw furnace can be greater than about 5%, which is an unacceptably high loss. Graphite particulate that has adhered to the fiber during the draw process also contributes to fiber breaks.

In order to reduce graphite particulation produced by oxidation of the graphite muffle material, and thus the number of resulting point defects, an inert gas is typically supplied to the interior of the furnace to prevent ambient air and other gases from entering the furnace. Unfortunately, there are a number of operations that occur during optical waveguide fiber draw, which present ambient air and other gases with the opportunity to enter the furnace despite delivery of the highest inert gas flow rates into the furnace. When a mistake is made during these draw operations, either by human error, or by mechanical failure, ambient air and/or other gases are often permitted to enter the furnace and a CO event occurs.

Many of these CO events are caused during movement or operation of the bottom door assemblies presently used to close the opening in the bottom of a draw furnace during blank load, unload and idle periods. Typical bottom door assemblies include a single gasket that is visually inspected to determine if a proper seal has been established when the bottom door assembly is brought into engagement with the bottom of the furnace during any of these periods. The purpose of the seal is to prevent the entrance of air into the furnace. Often, excess optical fiber depending from the fiber blank after a fiber break, or other foreign debris is trapped between the gasket and the bottom of the furnace when the bottom door assembly is closed. This in turn produces a gap which prevents a proper seal. Moreover, deflection of the bottom door assembly due to mechanical stresses applied to the various components of the assembly through repeated and continuous use will also result in a faulty seal. Unfortunately, this is often overlooked during visual inspection of the seal. If the top seal is removed from the draw furnace under such conditions, or during blank unload, air is rapidly sucked up into the furnace through any gap in the seal. Likewise, if the operator forgets to close the bottorm door assembly or improperly seats the bottom door assembly and removes the top hat, air is rapidly introduced into the furnace. This phenomenon, commonly referred to as the chimney effect, can result in a number of CO events.

In view of these and other shortcomings, an improved assembly and method of sealing an optical waveguide draw furnace is needed, which prevents the entrance of air and other unwanted gases into the draw furnace.

SUMMARY OF THE INVENTION

One aspect of the present invention relates to an apparatus for creating a seal with the bottom of an optical waveguide draw furnace. The apparatus includes an assembly that is constructed and arranged to mate with the bottom of the draw furnace to form a seal, and a leak detection system communicating with the assembly to determine if the seal leaks.

In another aspect, the invention relates to a method of sealing the bottom of an optical waveguide draw furnace.

The method includes the steps of seating an assembly on the bottom of the draw furnace to form a seal, delivering a flow of an inert gas between the assembly and the bottom of the draw furnace, and detecting the inert gas flow to determine if the seal leaks.

In yet another aspect the present invention is directed to an apparatus for sealing the bottom of an optical waveguide draw furnace. The apparatus includes a covering plate and first and second gaskets positioned on the covering plate such that the first gasket is spaced from the second gasket, and such that the first and second gaskets define a channel therebetween. The covering plate is movable into and out of engagement with the bottom of the draw furnace.

In still another aspect, the invention relates to a method of creating a seal to prevent air intake into an optical waveguide draw furnace that includes the steps of compressing at least two radially spaced, circumferential gaskets between a bottom door assembly and the bottom of the draw furnace to form an annular channel, and delivering an inert gas into the channel in an amount sufficient to prevent air from breaching the gaskets and entering the bottom of the draw furnace. The inert gas is monitored with a measuring device to determine if the inert gas decreases to a target value within a specified time period, and feedback is provided on the quality of the seal in a manner in which an operator or computer control system can determine whether an adeqate seal has been formed.

A further aspect of the present invention is directed to a method of verifying that the bottom of an optical waveguide draw furnace is sealed. The method includes the steps of moving a bottom door assembly into engagement with the bottom of the draw furnace, delivering an inert gas between the bottom door assembly and the bottom of the draw furnace, monitoring the inert gas with a measuring device to provide an inert gas reading, comparing the inert gas reading to a threshold value, and signaling the result of the comparing step to an operator.

The bottom door assembly of the present invention results in a number of advantages over other bottom door assemblies known in the art. Principally, the bottom door assembly of the present invention significantly reduces the number of CO events resulting from air entering the bottom of the draw furnace, which in turn significantly reduces the number and frequency of point defect losses in optical waveguide fibers drawn in furnaces, particularly those having graphite muffles. Moreover, the heavy guage construction of the bottom door assembly of the present invention is more robust than bottom door assemblies currently available, and further provides a self leveling function so that a proper seal can be achieved despite extended wear and tear on the components of the bottom door assembly.

Additional advantages are provided by the sealing assembly and method of the present invention. The combination of the bottom door assembly and leak detection system disclosed provides automatic detection of an improper seal between the bottom door assembly and the draw furnace. Accordingly, the inaccurate art of visually inspecting the bottom door seal is no longer necessary. Moreover, the present invention prohibits the continuation of draw operations if a faulty seal is detected by, inter alia preventing closure of the bottom door assembly with the draw furnace. Thus, this embodiment of the present invention provides a fail safe design for preventing the entrance of air into the bottom of the draw furnace, which again significantly reduces the number of CO events during drawing operations.

A single CO event in a graphite draw furnace typically results in a relatively large percentage of the optical fiber drawn having an unacceptable level of point defects. Accordingly, cleaning of the draw furnace is essential following a CO event. Generally, such cleaning operations result in the draw furnace being down for approximately six (6) hours to facilitate such cleaning and servicing operations. A further advantage of the present invention is thus the reduction in the amount of draw tower down time due to a substantial reduction in the frequency of CO events. Less down time results in increased production of optical fiber, and particularly optical fiber having a deminimus number of point defects.

The assembly and method of the present invention thus significantly reduces both mechanical and human error during draw operations that require the bottom door assembly to be in a closed position on the bottom of the draw furnace. Moreover, the system and method of the present invention automatically prevents certain draw operations until and unless a proper seal is formed between the bottom door assembly and the bottom of the draw furnace. Such a system and method significantly reduces the number of CO events during drawing operations, particulary those resulting from the chimney effect, which in turn results in a reduction in the number of point defects and an increase in furnace life.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of a bottom door assembly of the optical waveguide draw furnace sealing assembly of the present invention is shown in FIG. 1, and is designated generally throughout by reference numeral 10.

In accordance with the invention, the present invention for selectively sealing the bottom of an optical waveguide draw furnace includes an assembly that is constructed and arranged to mate with the bottom of a draw furnace, thereby forming a seal between the assembly and the bottom of the draw furnace, and preferably, a leak detection system which communicates with the assembly to monitor the status of the seal and further, to display that status to an operator of the draw furnace.

Figure 1:
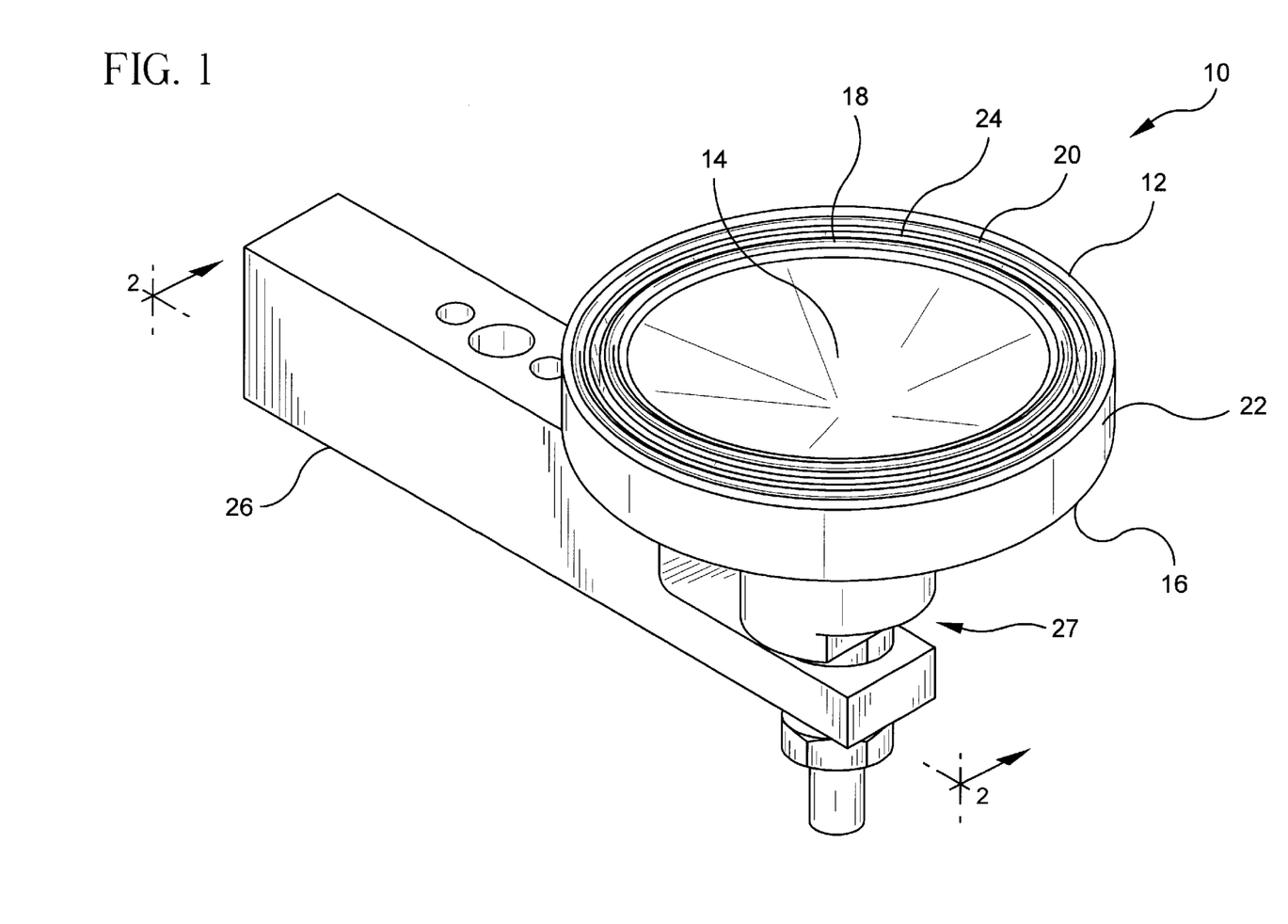
FIG. 1 is a perspective view of a preferred embodiment of the bottom door assembly of the present invention.

As embodied herein, and depicted in FIG. 1, a prefered embodiment of the bottom door assembly 10 includes a generally circumferential covering plate 12, preferably constructed from stainless steel, having a top surface 14 and a bottom surface 16. Supported on top surface 14 are a pair of gaskets, such as, but not limited to, inner O-ring 18 and outer O-ring 20. O-rings 18, 20 are preferably circumferentially spaced from a side 22 of covering plate 12 and from each other, and define a channel 24 positioned between O-rings 18 and 20 and extending circumferentially along top surface 14 of covering plate 12. Covering plate 12 is supported on a positioning arm 26 by a leveling device 27. Positioning arm 26 is preferrably constructed of stainless steel to significantly limit the amount of bending and warping, which otherwise could result from torque and other forces being applied to arm 26 over time.

Figure 2:
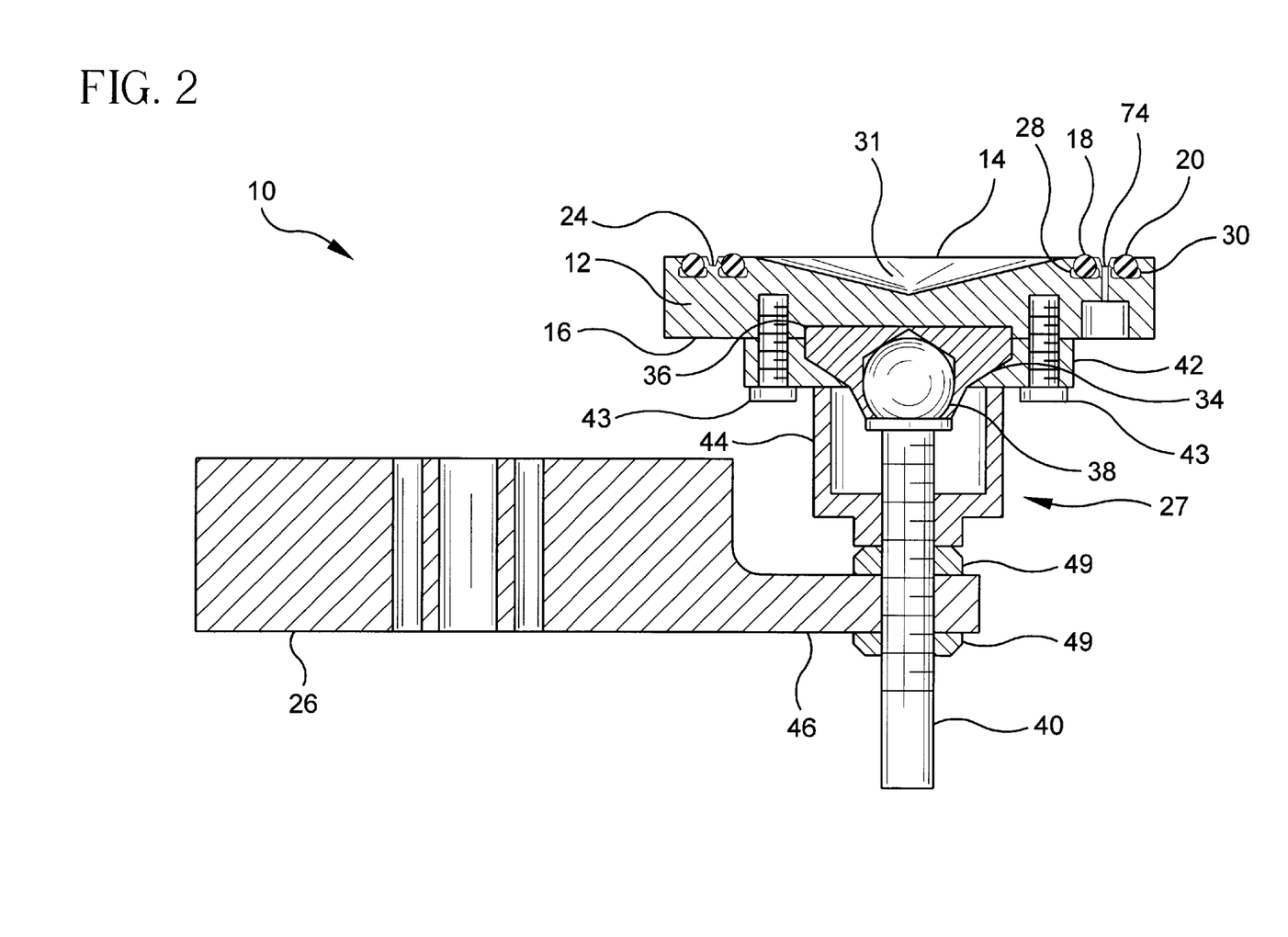
FIG. 2 is a cross-sectional view of the bottom door assembly taken through line 2—2 in FIG. 1.

As shown more clearly in FIG. 2, O-rings 18 and 20 are supported on top surface 14 by inner circumferrential groove 28 and outer circumferential groove 30 defined in covering plate 12. Annular channel 24 is formed between grooves 28 and 30. The central area of top surface 14 of covering plate 12 is preferably concave in shape to thereby channel fiber, fiber fragments, and other debris toward the center of covering plate 12. When incorporated, the center taper is preferably about 10 degrees or more with respect to a plane defined by O-rings 18 and 20. Leveling device 27 is preferably provided, which includes a leveling pad 34 seated withing a recess 36 defined in bottom surface 16 of covering plate 12. Leveling pad 34 is pivotally connected to a ball 38 depending from a threaded adjustment stem 40 to permit articulation of covering plate 12 with respect to positioning arm 26. Leveling pad 34 is secured to covering plate 12 via a retaining disc 42 and fasteners 43. A spacing cup 44 is positioned between retaining disc 42 and a positioning arm extension 46 to permit adjustment of the degree of covering plate articulation. Adjustment nuts 49 positioned on either side of positioning arm extension 46, in conjunction with spacing cup 44, enable an operator to adjust the spacing between positioning arm extension 46 and covering plate 12, which in turn increases or decreases the amount of play, and thus the extent of articulation available to covering plate 12. Accordingly, when bottom door assembly 10 is moved with any available actuation mechanism into engagement with the bottom of a draw furnace, leveling device 27 properly aligns the top surface 14 of covering plate 12 with the bottom surface of the draw furnace so that a seal is formed by compression of O-rings 18 and 20 therebetween. Moreover, covering plate 12 is self-centering over the opening in the bottom of the draw furnace. More specifically, as covering plate 12 contacts the bottom of the furnace, leveling pad 34 pivots on ball 38 to bring the entire periphery, and thus O-rings 18 and 20, into contact with the periphery of the bottom the draw furnace.

Figure 3:
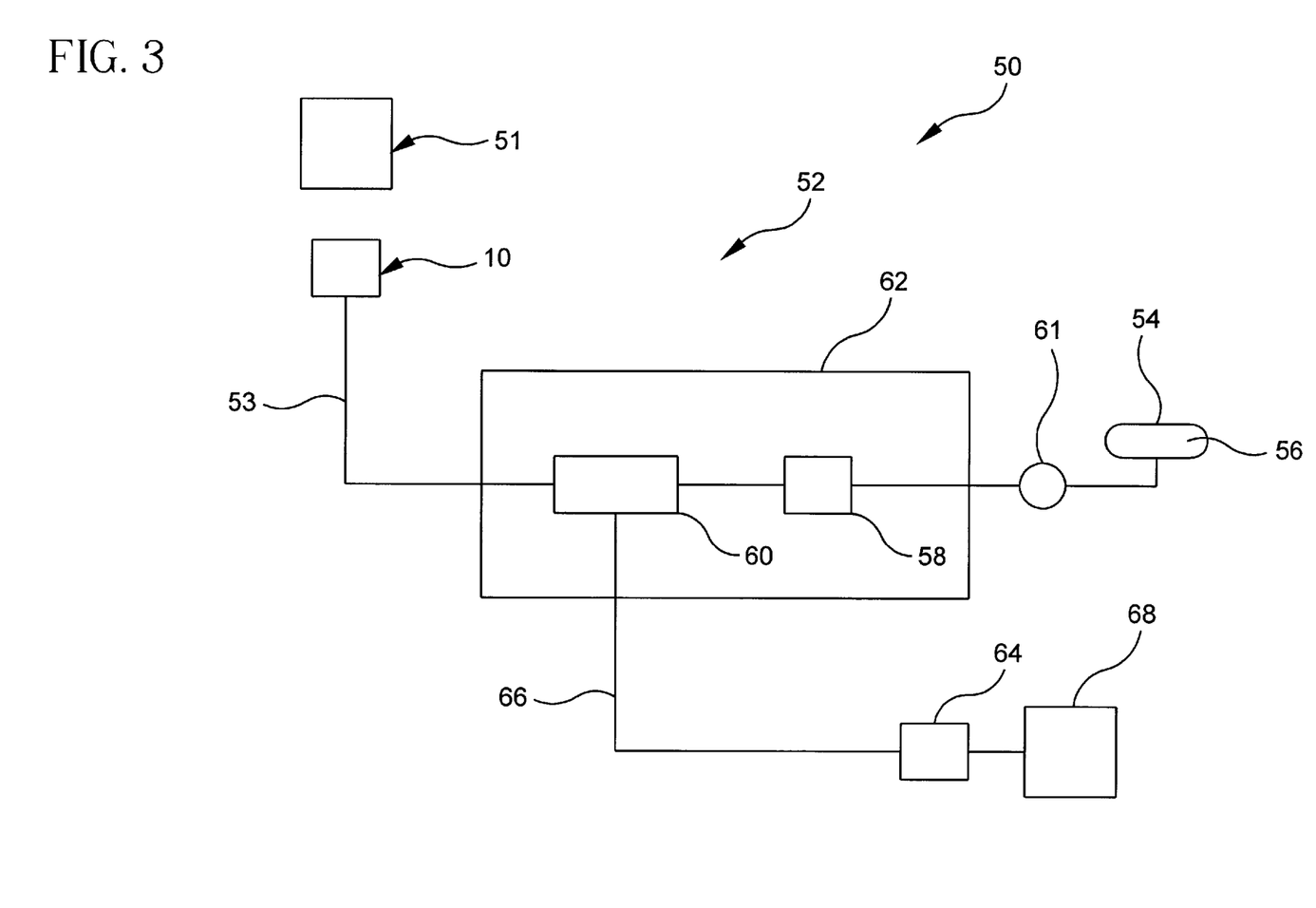
FIG. 3 is a schematic illustration of a preferred embodiment of the apparatus for sealing the bottom of a draw furnace in accordance with the present invention.

FIG. 3 depicts a more preferred embodiment of the optical waveguide draw furnace sealing assembly of the present invention. As shown schematically in FIG. 3, the preferred sealing assembly 50 includes a bottom door assembly such as bottom door assembly 10 described above, and leak detection system 52. Bottom door assembly 10 is movably positioned adjacent the bottom of a draw furnace 51, preferably with some type of mechanical, pnuematic or hydraulic activation mechanism, and communicates with a leak detection system 52 via a gas supply line 53. Leak detection system 52 includes an inert gas supply 54 for delivering an inert gas 56 to assembly 10 through supply line 53, a regulator 58 for controling the flow of inert gas 56, and preferably a flow meter 60 for measuring the flow rate of inert gas 56 as it is delivered to assembly 10. An air operated valve 61 is preferably positioned between inert gas supply 54 and regulator 58 to provide on/off control of the supply of inert gas 56, depending upon draw operation sequencing. Flow meter 60 and regulator 58 are preferably housed within a control cabinet 62 to prevent unauthorized tampering with the control settings of leak detection system 52. Flow meter 60 communicates with a computer 64 via a communication line 66. Flow detection signals from flow meter 60 are delivered to computer 64 where the signals are analyzed and converted to information useable to an operator. This information is then delivered to a display device such as a touch screen 68. An operator can then interact with touch screen 68 to control sealing assembly 50 and thus the various draw processes.

During optical waveguide fiber drawing operations, bottom door assembly 10 is maintained in an open position as optical fiber is being drawn. However, when a blank or preform (not shown) is loaded or unloaded from the draw furnace, the fiber breaks during drawing operations, or when the draw operation is at idle while the preform is within the furnace, it is necessary for bottom door assembly 10 to be closed. As discussed above, closure of the bottom door assembly is necessary to prevent air from entering the bottom of the draw furnace, and specifically, to prevent the chimney effect resulting from, inter alia, accidental premature opening of the draw furnace top hat assembly (not shown) when the bottom of the draw furnace is not properly sealed. Generally speaking, the top hat assembly should be in position over, and sealing the top of the draw furnace when bottom door assembly 10 is opened, or otherwise not sealing the bottom of the draw furnace to prevent the chimney effect.

When assembly 10 is in the open position, inert gas 56 is delivered to covering plate 12 at a rate of 4.0 SLPM. Inert gas 56 is preferably argon or some other inexpensive inert gas, but more expensive inert gases such as nitrogen, or helium may also be employed in the present invention. In order to reduce human error during draw operations, a desired maximum threshold inert gas flow rate is preferably calculated experimentally, and programmed into computer 64. In order to determine this maximum threshold flow rate of inert gas, oxygen measurements were taken at a point inside the draw furnace just above covering plate 12 when assembly 10 was properly seated in a closed position. It was determined that an inert gas flow rate of 1.5 SLPM to covering plate 12 maintained the oxygen at an acceptable level at the measurement point. This threshold was determined for prefered inert gas, argon. If other inert gases are selected, oxygen measurements would need to be taken to determine acceptable levels. Accordingly, to provide a safety factor, the threshold was set at a flow rate of 1.0 SLPM.

Figure 4:
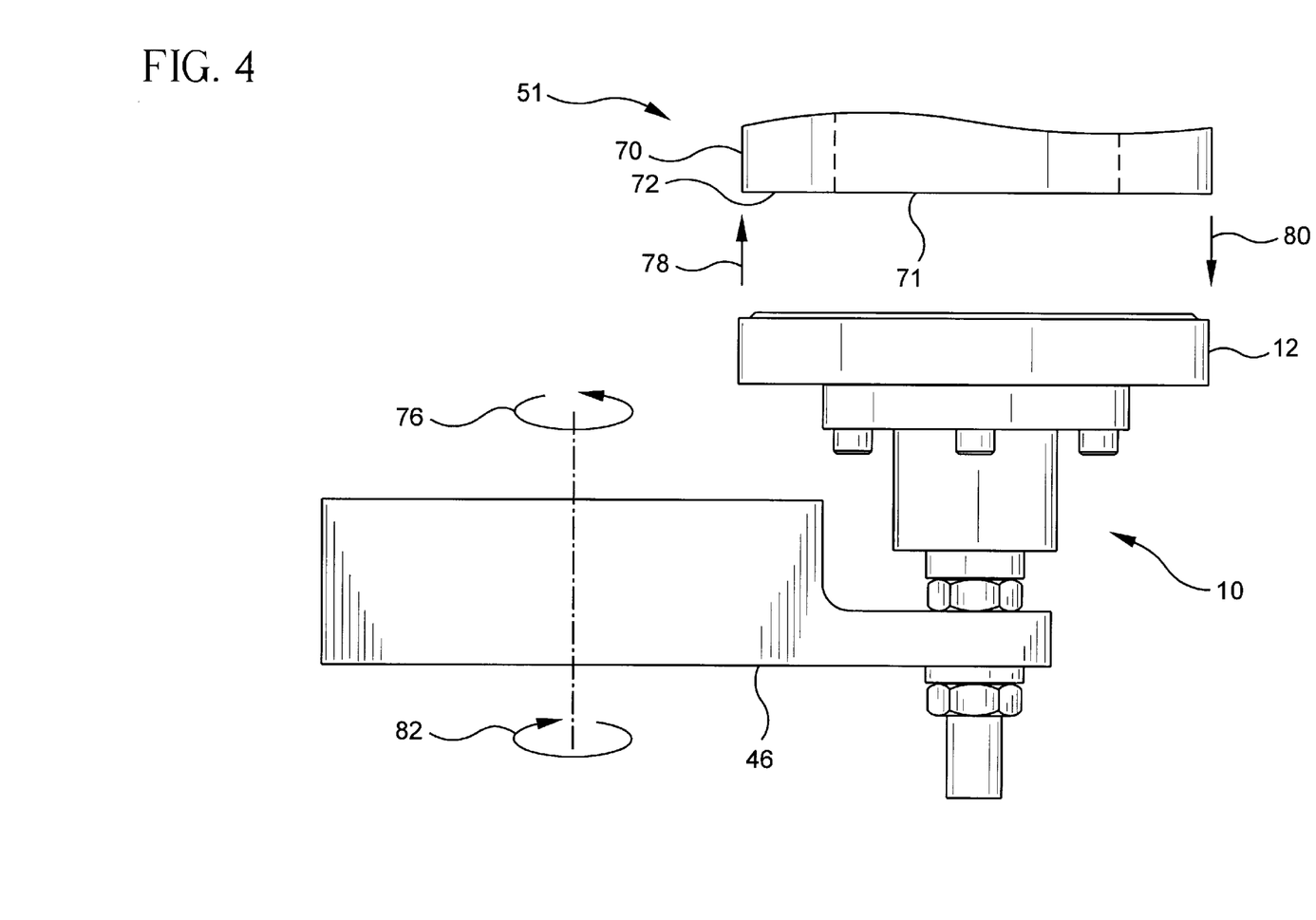
FIG. 4 is a side elevation view of the bottom door assembly of FIG. 1 shown positioned beneath the bottom of a draw furnace.

As illustrated in FIG. 4, once covering plate 12 is at a position wherein it should be sealingly engaged with sealing plate 72 of draw furnace 51, a proximity switch or other monitoring device (not shown) signals computer 64 that a seal should have been made therebetween, and a 15 second timer is engaged. As the 15 seconds elapse, assuming a seal has been made, the flow rate decreases and this information is transferred from flow meter 60 to computer 64. If a proper seal is achieved between covering plate 12 and sealing plate 72 with O-rings 18 and 20, the flow rate will fall below the target flow rate of 1.0 SLPM within the 15 second time period and further draw processing operations can continue. If, however, fiber or other debris is interfering with O-rings 18 and 20, or O-rings 18 and 20 otherwise are not properly seated between covering plate 12 and sealing plate 72, the flow rate will not reach the target flow rate of 1.0 SLPM during the 15 second time period due to inert gas 54 escaping past gaskets 18 and 20. In this case, further draw operations are suspended absent operator intervention.

In the preferred embodiment of leak detection system 52, flow meter 60 is a digital MASSRATE flow meter, model number 5700AJ1A1AA manufactured by Brooks, which operates from 0.0–5.0 volts of output voltage. Accordingly, an analog output in volts corresponding to the flow of inert gas 56, preferably argon, being read by flow meter 60 is transmitted to computer 64. Computer 64 is programmed to convert this information to a flow rate in SLPM. In the case of argon, each 1.0 volt is equivalent to a 1.0 SLPM flow rate, thus the intial flow rate of 4.0 SLPM and the target flow rate of 1.0 SLPM, correspond to 4.0 V and 1.0 V, respectively, delivered by flowmeter 60. This correlation would not necessarily be true if other inert gases were used, as the flowmeter of the present invention was calibrated for argon by the manufacturer. Thus, other gases would likely have other initial and threshold flow rates applicable to the present invention.

In operation and as partially depicted in FIGS. 2 and 4, bottom door assembly 10 of the present invention is moved by a conventional motor or other drive mechanism (not shown) from a position remote from the bottom 70 of draw furnace 51, to a position beneath an opening 71 centrally positioned in draw furnace bottom 70, as indicated by arrow 76. Assembly 10 is then elevated as indicated by arrow 78 until covering plate 12 contacts sealing plate 72 at the bottom of the draw furnace. As upwardly directed force is applied to covering plate 12 by positioning arm extension 46, and leveling device 27 cooperates with covering plate 12 to ensure that covering plate 12 is properly centered and aligned with sealing plate 72. Accordingly, O-rings 18 and 20 are partially compressed between sealing plate 72 and covering plate 12, thereby creating a seal therebetween. Proper engagement between covering plate 12 and sealing plate 72 is preferably signaled by a proximity switch or other monitoring device (not shown). Inert gas 56 delivered from inert gas supply 54 to assembly 10 passes through a port 74 (FIG. 2) in covering plate 12 and into channel 24 formed between O-rings 18 and 20. An initial inert gas flow of 4.0 SLPM into channel 24 is monitored by flow meter 60. If the seal is properly made, the inert gas flow begins to fall. Once it falls below the specified level of 1.0 SLPM, the seal is properly made and oxygen cannot enter through bottom opening 71 in draw furnace 51. This information is continually transferred from flow meter 60 to computer 64, which displays the information on touch screen 68. For example, computer 64 might display, "Bottom Door Seal is Good—Okay to Continue" or some other message on screen 68 to signal the operator that further draw operations such as blank removal can now be performed without air entering bottom opening 71 of draw furnace 51. Accordingly, the draw furnace operator can then remove the top hat assembly (not shown) without risk of a CO event in order to continue the draw operation.

If the seal is improperly made, however, the flow rate will not fall below 1.0 SLPM. When this occurs, computer 64 may display a message such as, "Troubleshoot Bottom Door Seal" on display screen 68 or otherwise signals the operator that there is not a proper seal between covering plate 12 and sealing plate 72. Preferably, bottom door assembly 10 will automatically move to an open position by withdrawing vertically from draw furnace 51 as shown by arrow 80 in FIG. 4 and rotating away from draw furnace 51 as indicated by arrow 82. The operator can then visually inspect gaskets 18 and 20 for obstructions and wear, and/or take the necessary actions to correct any problems with the proper functioning of bottom door assembly 10. Once troubleshooting is completed, the operator can press the—"Okay to Continue", or some other message displayed on touch screen 68 to re-close bottom door assembly 10 and reinitiate the sealing method of the present invention as described above. Continuation of draw operations, however, will not be permitted until a proper seal is created between covering plate 12 and sealing plate 72. Accordingly, the apparatus and method of the present invention provides automatic detection of an improper seal or otherwise unsafe condition prior to oxidation damage to the graphite draw furnace muffle caused by air inadvertently entering bottom opening 71 of draw furnace 51.

The structure and method of the present invention is in no way intended to be limited to the embodiments described above. It is to be understood, for example, that O-rings 18 and 20 can be some other sealing mechanism commonly know in the art. Moreover, O-rings 18 and 20 can be supported on sealing assembly 72 of draw furnace 51 rather than on covering plate 12 without effecting the operation of the present invention. Moreover, the method of detecting whether or not a proper seal has been established has been described with reference to inert gas flow detection. It is intended that the method of the present invention, as well as the system, can also be practiced using other detection methods and systems, such as, but not limited to, detecting the pressure of the inert gas with some type of pressure measurement device or system.

It will be apparent to those skilled in the art that various other modifications and variations can be made to the present invention without departing from the spirit and scope of the invention. Thus, it is intended that the present invention cover the modifications and variations of this invention provided they come within the scope of the appended claims and their equivalents.

What is claimed is:

1. An apparatus for creating a seal with the bottom of an optical waveguide draw furnace, said apparatus comprising:
an assembly constructed and arranged to mate with the bottom of the draw furnace to form a seal, wherein either said assembly or the bottom of the optical waveguide draw furnace includes at least two spaced apart gaskets; and
a leak detection system communicating with said assembly to determine if the seal leaks.

2. The apparatus of claim 1 wherein said assembly comprises a covering plate having a top surface and wherein either the top surface of said covering plate or the bottom of the draw furnace includes a first gasket and a second gasket radially spaced from the first gasket.

3. The apparatus of claim 2 wherein said assembly further comprises an arm coupled to said covering plate to move said covering plate into and out of contact with the bottom of the draw furnace.

4. The apparatus of claim 3 wherein said assembly further comprises a leveling mechanism disposed between said arm and said covering plate, said leveling mechanism being attached to said arm and pivotally connected to said covering plate to permit automatic alignment of said covering plate with the bottom of the draw furnace.

5. The apparatus of claim 1 wherein said leak detection system comprises:
   an inert gas source communicating with said assembly to supply an inert gas;
   a flow meter positioned downstream of said inert gas source for detecting a flow rate of the inert gas and for transmitting signals corresponding to the flow rate; and
   a computer linked to said flow meter to receive the signals, said computer being programmed to analyze the signals to determine if the seal is acceptable.

6. The apparatus of claim 5 wherein said inert gas comprises argon.

7. The apparatus of claim 2 wherein at least a portion of the top surface of said covering plate is concave in shape.

8. An apparatus for sealing the bottom of an optical waveguide draw furnace comprising:
   a covering plate; and
   first and second gaskets positioned on said covering plate or the bottom of the draw furnace such that said first gasket is spaced from said second gasket, and such that said first and second gaskets define a channel therebetween, and wherein said covering plate is movable into engagement with the bottom of the draw furnace to form a seal therewith.

9. The apparatus as claimed in claim 8 wherein said covering plate includes a concave surface.

10. The apparatus as claimed in claim 8 further compising an arm for moving said covering plate and a leveling device for automatically seating said covering plate on the bottom of the furnace.

11. The apparatus as claimed in claim 8 further comprising a gas leak detection system in fluid communication with the channel.

12. A method of sealing the bottom of an optical waveguide draw furnace, said method comprising the steps of:
   seating a covering plate on the bottom of the draw furnace to form a seal therebetween, wherein either said covering plate or the bottom of the optical waveguide draw furnace includes at least two spaced apart gaskets;
   delivering a flow of an inert gas between said covering plate and the bottom of the draw furnace; and
   detecting an aspect of said inert gas in a manner which is sufficient to determine if the seal is air-tight.

13. The method of claim 12 further comprising the step of indicating the status of the seal.

14. The method of claim 12 wherein the step of delivering a flow of an inert gas includes the step of introducing said inert gas into a channel defined between a first and second gasket on said covering plate.

15. The method of claim 12 wherein said detecting step comprises measuring the flow rate of said inert gas in said flow delivering step.

16. The method of claim 12 wherein said detecting step comprises measuring the pressure of said inert gas created by said flow delivering step.

17. A method of creating a seal to prevent air intake into an optical waveguide draw furnace, said method comprising the steps of:
   compressing at least two radially spaced, circumferential gaskets between a bottom door assembly and the bottom of the draw furnace thereby defining an annular channel between the bottom of the draw furnace, said bottom door assembly, and said at least two gaskets;
   delivering an inert gas into the channel in an amount sufficient to prevent air from breaching said compressed at least two gaskets and entering the bottom of the draw furnace;
   monitoring said inert gas with a measuring device to determine if said inert gas decreases to a target value within a specified time period; and
   providing feedback on the quality of the seal in a manner in which an operator or computer control system can determine whether an adeqate seal has been formed.

18. The method of claim 17 wherein said method further comprises the step of automatically retracting the bottom door assembly from the bottom of the draw furnace if a satisfactory seal is not formed.

19. The method of claim 17 wherein said delivering step comprises the step of delivering argon at a predetermined flow rate.

20. The method of claim 19 wherein said monitoring step comprises the step of measuring the flow rate of the argon.

21. The method of claim 17 wherein said delivering step comprises the step of delivering argon at a predetermined pressure.

22. The method of claim 21 wherein said monitoring step comprises the step of measuring the pressure of the argon.

23. A method of verifying that the bottom of an optical waveguide draw furnace is sealed, said method comprising the steps of:
   moving a bottom door assembly into engagement with the bottom of the draw furnace, wherein either said assembly or the bottom of the optical waveguide draw furnace includes at least two spaced apart gaskets;
   delivering an inert gas between the bottom door assembly and the bottom of the draw furnace;
   monitoring the inert gas with a measuring device to provide an inert gas reading;
   comparing the inert gas reading to a threshold value; and
   signaling the result of said comparing step to an operator.

24. An apparatus for sealing the bottom of an optical waveguide draw furnace comprising:
   a covering plate;
   an arm for moving said covering plate and a leveling device for automatically seating said covering plate on the bottom of the furnace;
   first and second gaskets positioned on said covering plate or the bottom of the draw furnace such that said first gasket is spaced from said second gasket, and such that said first and second gaskets define a channel therebetween, and wherein said covering plate is movable into engagement with the bottom of the draw furnace to form a seal therewith.

25. An apparatus for creating a seal with the bottom of an optical waveguide draw furnace, said apparatus comprising:
   an assembly constructed and arranged to mate with the bottom of the draw furnace to form a seal, said assembly comprising:
      a covering plate having a top surface, wherein either the top surface of said covering plate or the bottom of the draw furnace includes a first gasket and a second gasket radially spaced from the first gasket,
      an arm coupled to said covering plate to move said covering plate into and out of contact with the bottom of the draw furnace, and
      a leveling mechanism disposed between said arm and said covering plate, said leveling mechanism being attached to said arm and pivotally connected to said covering plate to permit automatic alignment of said covering plate with the bottom of the draw furnace; and a leak detection system communicating with said assembly to determine if the seal leaks.

26. An apparatus for creating a seal with the bottom of an optical waveguide draw furnace, said apparatus comprising:

an assembly constructed and arranged to mate with the bottom of the draw furnace to form a seal, wherein either said assembly or the bottom of the optical waveguide draw furnace includes at least two spaced apart gaskets; and a leak detection system communicating with said assembly to determine if the seal leaks, said leak detection system comprising:

an inert gas source communicating with said assembly to supply an inert gas;

a flow meter positioned downstream of said inert gas source for detecting a flow rate of the inert gas and for transmitting signals corresponding to the flow rate; and a computer linked to said flow meter to receive the signals, said computer being programmed to analyze the signals to determine if the seal is acceptable.

27. The apparatus of claim 26 wherein said inert gas comprises argon.

28. An apparatus for creating a seal with the bottom of an optical waveguide draw furnace, said apparatus comprising:

an assembly constructed and arranged to mate with the bottom of the draw furnace to form a seal, said assembly comprising a covering plate having a top surface, at least a portion of which is concave in shape, and wherein either the top surface of said covering plate or the bottom of the draw furnace includes a first gasket and a second gasket radially spaced from the first gasket; and a leak detection system communicating with said assembly to determine if the seal leaks.

* * * * *